United States Patent [19]

Arsenault et al.

[11] Patent Number: 5,388,849
[45] Date of Patent: Feb. 14, 1995

[54] COMPACT WEIGHT TRANSFER DEVICE FOR TRACTOR TRAILER VEHICLES

[75] Inventors: Julien Arsenault, St-Simeon; Sylvio Horth, Paspebiac, both of Canada

[73] Assignee: Soudure Caplan, Quebec, Canada

[21] Appl. No.: 190,283

[22] Filed: Feb. 2, 1994

[30] Foreign Application Priority Data

Aug. 20, 1993 [CA] Canada .................... 2104491

[51] Int. Cl.⁶ ............................................. B62D 53/08
[52] U.S. Cl. .......................... 280/425.1; 267/64.27; 267/64.28; 267/122; 280/407.1; 280/439
[58] Field of Search ............. 280/405.1, 407.1, 425.1, 280/425.2, 439; 267/64.11, 64.27, 64.28, 122

[56] References Cited

U.S. PATENT DOCUMENTS

| | | | |
|---|---|---|---|
| 2,733,931 | 2/1956 | Reid et al. | 280/425.1 |
| 2,996,312 | 8/1961 | Paul | 280/439 |
| 3,197,237 | 7/1965 | Smith | 280/418.1 |
| 3,253,840 | 5/1966 | Granning | 280/425.1 |
| 3,257,124 | 6/1966 | Mendez | 280/407.1 |
| 3,347,563 | 10/1967 | Harbers | 280/425.1 |
| 3,380,758 | 9/1968 | Granning | 280/425.1 |
| 3,512,802 | 5/1970 | La Rock, Jr. | 280/407.1 |
| 3,717,273 | 2/1973 | Berends | 280/425.1 |
| 3,776,573 | 12/1973 | Paielli | 280/407.1 |
| 3,810,663 | 5/1974 | Berends | 280/425.1 |
| 4,279,430 | 7/1981 | Tagg et al. | 280/439 |
| 4,566,716 | 1/1986 | Modat | 280/439 |
| 4,580,806 | 4/1986 | Kolstad et al. | 280/439 |
| 4,740,005 | 4/1988 | Babin | 280/407.1 |
| 5,020,820 | 6/1991 | Renner et al. | 280/439 |
| 5,040,815 | 8/1991 | Evans | 280/425.2 |

*Primary Examiner*—Mitchell J. Hill
*Attorney, Agent, or Firm*—Galgano & Burke

[57] ABSTRACT

The weight transfer device is for a tractor trailer including a tractor for pulling a trailer. The device comprises a mount having opposite ends provided with attaching elements for attaching transversely the mount between a pair of rearward parallel frame side rails of the tractor behind its fifth wheel. The mount receives the base of a bag unit having an upper surface over the base at an adjustable distance therefrom, and an inflatable air bag between the base and the upper surface for adjusting the distance. A bearing structure is mounted on top of the upper surface for upwardly pushing against the trailer without significantly hindering its pivotal movement around the fifth wheel. The device further comprises a compact guiding mechanism for vertically guiding the upper surface of the bag unit while preventing the bag from drooping when the bearing structure is pushing against the trailer. The guiding mechanism consists of an elongated member having an end connected to the upper surface and an opposite end projecting downwards therefrom inside the bag, and an upright sleeve connected to the mount beneath the bag for slidably receiving the opposite end of the elongated member.

10 Claims, 3 Drawing Sheets

COMPACT WEIGHT TRANSFER DEVICE FOR TRACTOR TRAILER VEHICLES

BACKGROUND OF THE INVENTION

The invention relates to weight transfer devices for tractor trailer vehicles, and more particularly to a weight transfer device placed behind a tractor's fifth wheel for exerting an upward pressure against a trailer underside for forcing down the rear tandem drive wheels of the tractor so as to maintain or enhance their traction for example on uneven ground where the trailer tends to uplift the drive wheels of the tractor.

DESCRIPTION OF THE RELATED ART

Known in the art is U.S. Pat. No. 4,740,005 (BABIN), which describes a weight transfer device for tractor trailer vehicles, intended to transfer weight from a trailer over rear drive wheels of a tractor for increasing their traction. This device takes considerable space due to two longitudinal stabilizing arms extending beside frame side rails of the tractor, from a crosswise mounting bar to a remote rotation plate mounted on top of an inflatable air bag, over which the trailer's underside comes to rest. For tractors having a small rear frame portion, a frame extension has to be provided for the installation of this device. Such an operation is time consuming and expansive. Furthermore, this device is more inclined to brake since it comprises various movable parts. Bending effects are also transmitted to the tractor's frame by the stabilizing arms, which might prove damageable.

Also known in the art are U.S. Pat. Nos. 3,776,573 (PAIELLI); 3,512,802 (LA ROCK, Jr.); 3,380,758 (GRANNING); 3,257,124 (MENDEZ); 5,040,815 (EVANS); 5,020,820 (RENNER et al.); and 3,197,237 (SMITH), which describe various devices relating to tractor trailer vehicles, for maintaining or increasing the traction of their drive wheels or improving the coupling mechanism between the tractor and the trailer. However, installation of these devices requires substantial modifications of the tractor frame and equipments, and takes relatively considerable space which is not always available behind the tractor's cab.

OBJECTS OF THE INVENTION

It is therefore an object of the present invention to provide weight transfer device which is compact, easy to install and adapts to most models of tractor trailer vehicles.

SUMMARY OF THE INVENTION

According to the present invention, there is provided a weight transfer device for a tractor trailer including a tractor for pulling a trailer, said tractor having a pair of rearward parallel frame side rails and a fifth wheel for attachment with said trailer, said device comprising:

a mount having opposite ends provided with attaching means for attaching transversely said mount between said frame side rails behind said fifth wheel;

a bag unit including a base mounted onto said mount, an upper surface over said base at an adjustable distance therefrom, and an expansible bag between said base and said upper surface for adjusting said distance;

bearing means mounted on top of said upper surface, for upwardly pushing against said trailer without significantly hindering its pivotal movement around said fifth wheel; and guiding means for vertically guiding said upper surface of the bag unit, said guiding means including:
an elongated member having an end connected to said upper surface and an opposite end projecting downwards therefrom inside said bag; and
an upright sleeve connected to said mount beneath said bag, for slidably receiving said opposite end of the elongated member;

whereby said guiding means prevent said bag from drooping when said bearing means are pushing against said trailer.

Preferably, the guiding means include stop means for preventing disengagement of said elongated member from said sleeve.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DESCRIPTION OF PREFERRED EMBODIMENTS

Figure 1:
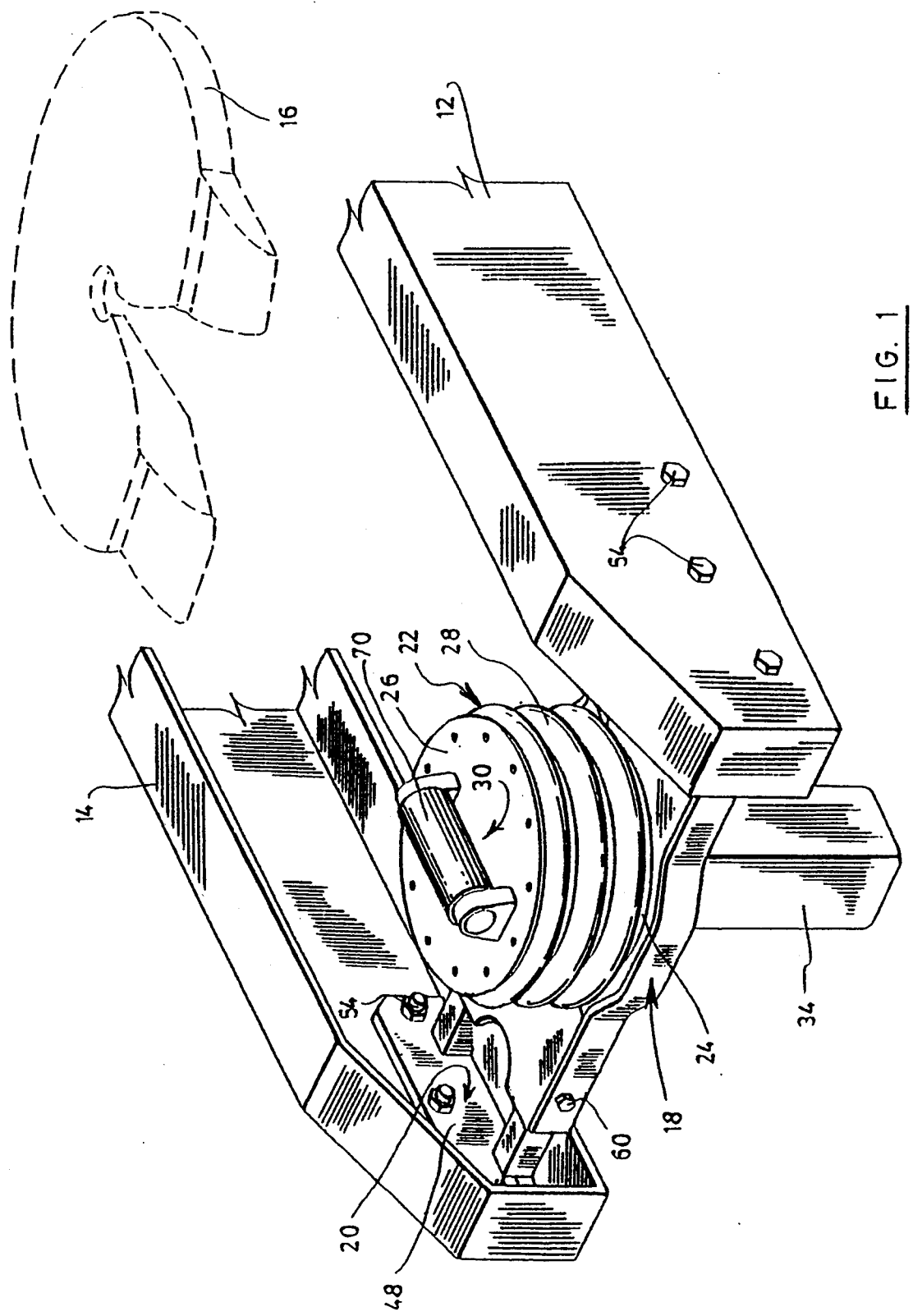
FIG. 1 is a perspective view of the weight transfer device according to the present invention, installed on a tractor frame.

In the following description and in the drawings, the same numerals will refer to the same elements.

Referring to FIG. 1, there is shown a weight transfer device according to the present invention, which is mounted onto a pair of rearward parallel frame side rails 12, 14 of a tractor having a fifth wheel 16 (shown in dotted lines) for pulling a trailer (not shown in the Figure).

The weight transfer device comprises a mount 18 having opposite ends provided with attachments 20 (only one is shown in the Figure) for attaching transversally the mount 18 between the frame side rails 12, 14 behind the fifth wheel 16.

The weight transfer device also comprises a bag unit 22 including a base 24 mounted onto the mount 18, an upper surface 26 over the base 24 at an adjustable distance therefrom, and an inflatable air bag 28 (or any equivalent expansible bag) between the base 24 and the upper surface 26 for adjusting the aforesaid distance.

The weight transfer device further comprises a bearing structure 30 mounted on top of the upper surface 26, for upwardly pushing against the underside of the trailer's forepart without significantly hindering the trailer's pivotal movement around the fifth wheel 16.

The weight transfer device further comprises a guiding mechanism for vertically guiding the upper surface 26 of the bag unit 22.

Figure 2:
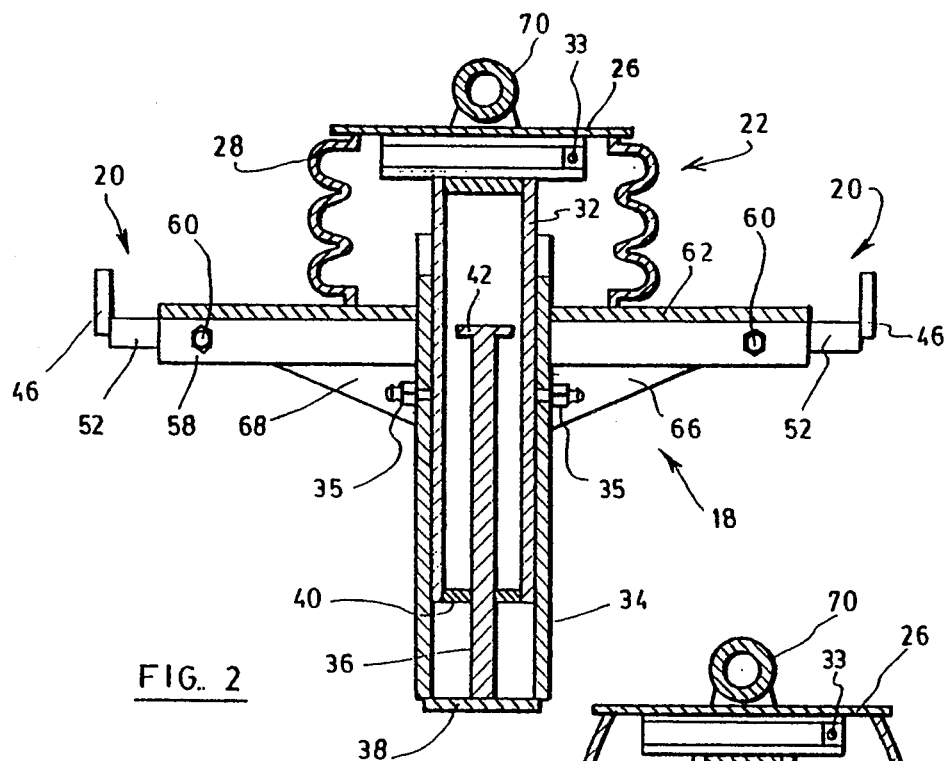
FIGS. 2 and 3 show cross-sectional side elevation views of the weight transfer device according to the present invention, in its retracted and expanded positions respectively.
Figure 3:
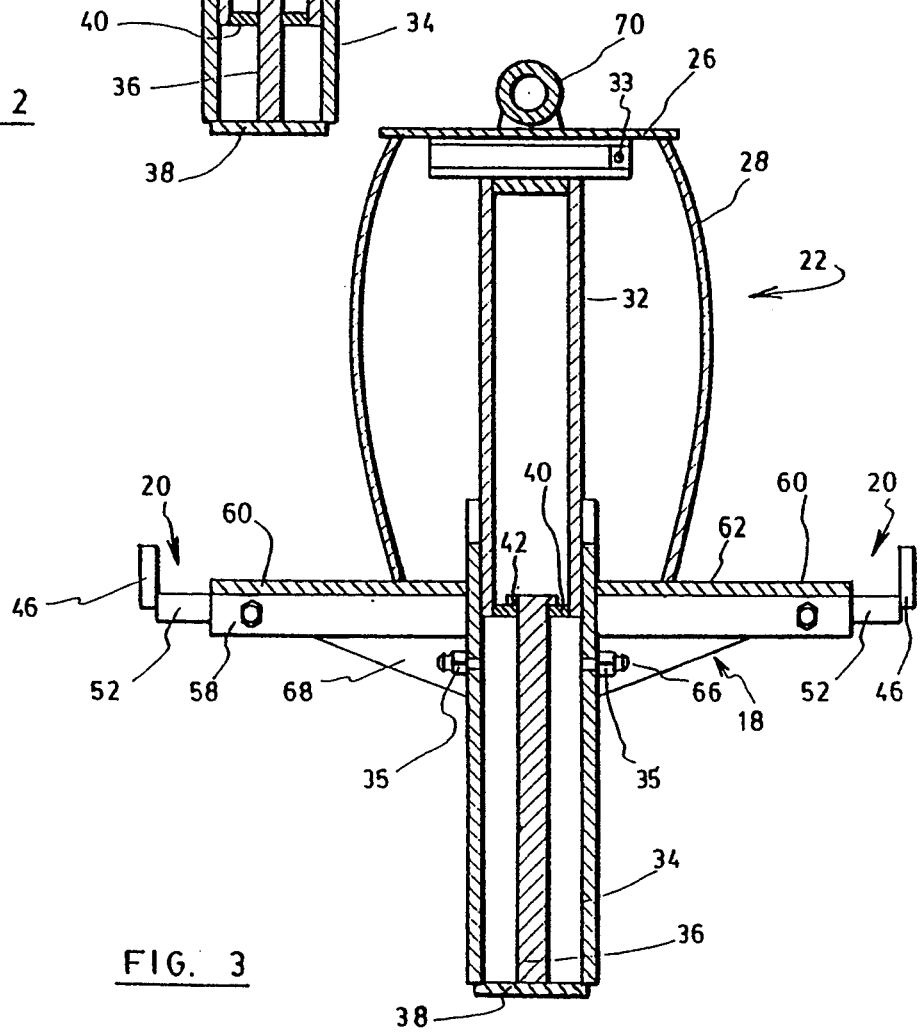

Referring to FIGS. 2 and 3, the guiding mechanism includes a tubular elongated member 32 having an upper end connected to the upper surface 26 of the bag unit 22 by means of a hinge 33 having a pivot axis substantially parallel to the side rails 12, 14 so as to provide the upper surface 26 a certain degree of movement. The elongated member 32 also has an opposite lower end projecting downwards from the upper surface 26, inside the bag 28. The guiding mechanism also includes an upright sleeve 34 connected to the mount 18 beneath the bag 28, for slidably receiving the lower end of the elongated member 32. Such a guiding mechanism prevents among other things the bag 28 from drooping when the bearing structure 30 is pushing against the trailer's underside.

The guiding mechanism also includes a stop for preventing disengagement of the elongated member 32 from the sleeve 34. This stop is provided by means of a rod 36 projecting inside the sleeve 34 along a central axis thereof. The rod 36 has a lower end connected to a plate 38 closing a lower end of the sleeve 34. A mobile carriage 40, connected to the lower end of the elongated member 32, is slidably mounted around the rod 36. The stop is completed by a stop surface 42 at an upper end of the rod 36, for stopping the mobile carriage 40 as shown in FIG. 3 when the bag 28 is expanded.

The sleeve 34 is provided with greased fittings 35 for lubrication between the sleeve 34 and the elongated member 32.

Figure 5:
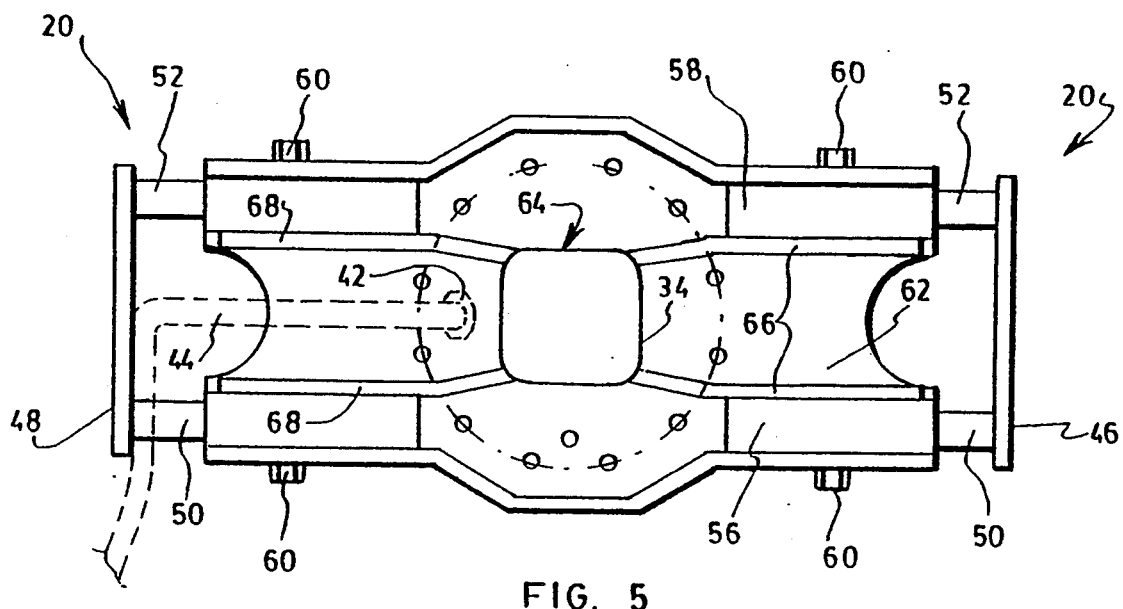

Referring to FIG. 5, the bag 28 has an air inlet/outlet port 42 for connection to a pressurized air line 44 (shown in dotted lines) which is preferably provided with a safety valve (not shown in the Figure) adjustable for opening in response to a predetermined air pressure for preventing burst of the bag 28.

Figure 4:
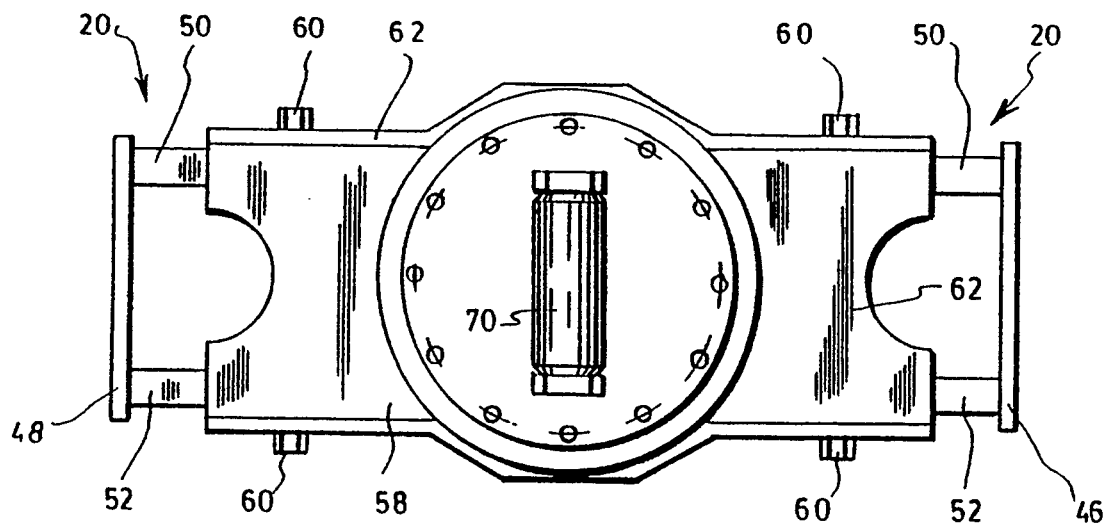
FIGS. 4 and 5 show respectively top and bottom plan views of the weight transfer device according to the present invention.

Referring to FIG. 4, the attachments 20 comprise a pair of brackets 46, 48 each having on a same side two bars 50, 52 projecting perpendicularly therefrom and apart from one another.

Referring to FIGS. 1 and 4, each of the brackets 46, 48 (only bracket 48 is visible in FIG. 1) is connectable to the side rails 12, 14 of the tractor by means of bolting elements 54, so that the bars 50, 52 of one of the brackets 46, 48 face the bars of the other brackets 46, 48. Since the efficiency of the weight transfer device is proportional to the distance between the fifth wheel 16 and the bag unit 22, the brackets 46, 48 should be installed as much as possible toward the rear of the tractor. Furthermore, the weight transfer device should be installed preferably so that the bearing structure 70 lower below the top surface of the side rails 12, 14 when the bag 28 is completely retracted as shown in FIG. 2.

The mount 18 comprises front and rear paralleled elongated support members 56, 58 each having opposite ends provided respectively with longitudinal housings for receiving the bars 50, 52 telescopically. A central plate 62 is connected between the front and rear support members 56, 58, onto which the base 24 of the bag unit 22 is mounted. Once the plate has been preferably centered between the side rails 12, 14, the support members 56, 58 are fixedly attached to the bars 50, 52 by means of fixing elements 60 such as bolts.

Referring to FIGS. 2 and 5, the central plate 62 is provided with an aperture 64 in which an upper portion of the sleeve 34 is secured.

The mount 18 further comprises two pairs of reinforcement members 66, 68 placed symmetrically along the support members 56, 58 with respect to the sleeve 34. Each reinforcement member 66, 68 has a lateral side connected to the sleeve 34, and an upper side connected to the corresponding support members 56, 58.

Referring again to FIG. 1, the bearing structure 30 comprises an idler roller 70 having a rotation axis extending in a substantially radial direction with respect to the fifth wheel 16 when the weight transfer device is mounted onto the tractor, for rolling contact with the trailer's underside.

If need be, the weight transfer device can be further provided with a race (not shown in the Figures) attachable beneath the trailer, for providing the trailer with a bearing surface for the idler roller 70. Such bearing surface should extend along a path followed by the idler roller 70 under the trailer when it pivots around the fifth wheel 16.

The weight transfer device improves or at least maintains the traction of the tractor's drive wheels, and ensures a maximal efficiency either on paved or forestry roads, in any climatic conditions (snow, rain, etc.). It also prevents hopping of the tractor, reduces the tire wear, lessens the risks of a differential breakage, and considerably reduces the use of chains. It is compact and simple to install since there is only one piece (the mount 16) to connect to the tractor. Moreover, it adapts to most of the tractor trailer models.

Although the present invention has been explained hereinabove by way of preferred embodiments thereof, it should be pointed out that any modifications to these preferred embodiments, within the scope of the appended claims, are not deemed to change or alter the nature and scope of the present invention.

What is claimed is:

1. A weight transfer device for a tractor trailer including a tractor for pulling a trailer, said tractor having a pair of rearward parallel frame side rails and a fifth wheel for attachment with said trailer, said device comprising:

a mount having opposite ends provided with attaching means for attaching transversely said mount between said frame side rails behind said fifth wheel;

a bag unit including a base mounted onto said mount, an upper surface over said base at an adjustable distance therefrom, and an expansible bag between said base and said upper surface for adjusting said distance;

bearing means mounted on top of said upper surface, for upwardly pushing against said trailer without significantly hindering its pivotal movement around said fifth wheel; and guiding means for vertically guiding said upper surface of the bag unit, said guiding means including:
an elongated member having an end connected to said upper surface and an opposite end projecting downwards therefrom inside said bag; and
an upright sleeve connected to said mount beneath said bag, for slidably receiving said opposite end of the elongated member;

whereby said guiding means prevent said bag from drooping when said bearing means are pushing against said trailer.

2. A weight transfer device according to claim 1, wherein said guiding means include stop means for preventing disengagement of said elongated member from said sleeve.

3. A weight transfer device according to claim 2, wherein said elongated member is tubular, and said stop means comprise:

a rod projecting inside said sleeve along a central axis thereof, said rod having a lower end connected to a plate closing a lower end of said sleeve;

a mobile carriage slidably mounted around said rod, said mobile carriage being connected to said opposite end of the elongated member; and a stop surface at an upper end of said rod, for stopping said mobile carriage when said bag is expanded.

4. A weight transfer device according to claim 1, wherein said sleeve is provided with greased fittings for lubrication between said sleeve and said elongated member.

5. A weight transfer device according to claim 1, wherein said expansible bag is an inflatable air bag having an air inlet/outlet port for connection to a pressurized air line provided with a safety valve adjustable for opening in response to a predetermined air pressure for preventing burst of said bag.

6. A weight transfer device according to claim 1, wherein:

said attaching means comprise: a pair of brackets each having on a same side two bars projecting perpendicularly therefrom and apart from one another; and bolting means for bolting said brackets to said rails respectively, so that said bars of one of said brackets face said bars of the other bracket; and said mount comprises: front and rear paralleled elongated support members each having opposite ends provided respectively with longitudinal housings for receiving said bars telescopically, and fixing means for fixedly attaching said support members to said bars; and a central plate connected between said front and rear support members, onto which said base of the bag unit is mounted, said central plate being provided with an aperture in which an upper portion of said sleeve is secured.

7. A weight transfer device according to claim 6, wherein said mount further comprises two pairs of reinforcement members placed symmetrically along said support members with respect to said sleeve, each reinforcement member having a lateral side connected to said sleeve, and an upper side connected to the corresponding support member.

8. A weight transfer device according to claim 1, wherein said bearing means comprise an idler roller having a rotation axis extending in a substantially radial direction with respect to said fifth wheel when said device is mounted on said tractor, for rolling contact with said trailer.

9. A weight transfer device according to claim 1, wherein said end of the elongated member is connected to said upper surface by means of a hinge having a pivot axis substantially parallel to said frame side rails when said device is mounted on said tractor.

10. A weight transfer device according to claim 1, wherein:

said elongated member is tubular;

said guiding means include stop means for preventing disengagement of said elongated member from said sleeve, said stop means comprising:

a rod projecting inside said sleeve along a central axis thereof, said rod having a lower end connected to a plate closing a lower end of said sleeve;

a mobile carriage slidably mounted around said rod, said mobile carriage being connected to said opposite end of the elongated member; and a stop surface at an upper end of said rod, for stopping said mobile carriage when said bag is expanded;

said sleeve is provided with greased fittings for lubrication between said sleeve and said elongated member;

said expansible bag is an inflatable air bag having an air inlet/outlet port for connection to a pressurized air line provided with a safety valve adjustable for opening in response to a predetermined air pressure for preventing burst of said bag;

said attaching means comprise:

a pair of brackets each having on a same side two bars projecting perpendicularly therefrom and apart from one another; and bolting means for bolting said brackets to said rails respectively, so that said bars of one of said brackets face said bars of the other bracket;

said end of the elongated member is connected to said upper surface by means of a hinge having a pivot axis substantially parallel to said frame side rails when said device is mounted on said tractor;

said mount comprises:

front and rear paralleled elongated support members each having opposite ends provided respectively with longitudinal housings for receiving said bars telescopically, and fixing means for fixedly attaching said support members to said bars;

a central plate connected between said front and rear support members, onto which said base of the bag unit is mounted, said central plate being provided with an aperture in which an upper portion of said sleeve is secured; and two pairs of reinforcement members placed symmetrically along said support members with respect to said sleeve, each reinforcement member having a lateral side connected to said sleeve, and an upper side connected to the corresponding support member; and said bearing means comprise an idler roller having a rotation axis extending in a substantially radial direction with respect to said fifth wheel when said device is mounted onto said tractor, for rolling contact with said trailer.

* * * * *